United States Patent
Huang et al.

(10) Patent No.: US 12,548,254 B2
(45) Date of Patent: Feb. 10, 2026

(54) THREE-DIMENSIONAL IMAGING SYSTEM AND THREE-DIMENSIONAL IMAGING METHOD

(71) Applicant: Industrial Technology Research Institute, Hsinchu (TW)

(72) Inventors: Wei-Shiang Huang, Tainan (TW); Chih-Kai Chiu, Tainan (TW); Yong-Sin Syu, Kaohsiung (TW); Jhe-Ruei Li, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 204 days.

(21) Appl. No.: 18/422,018

(22) Filed: Jan. 25, 2024

(65) Prior Publication Data

US 2025/0139894 A1 May 1, 2025

(30) Foreign Application Priority Data

Oct. 25, 2023 (TW) .................................. 112140867

(51) Int. Cl.
*G06T 17/10* (2006.01)
*G06T 5/70* (2024.01)
*G06T 7/90* (2017.01)

(52) U.S. Cl.
CPC ............... *G06T 17/10* (2013.01); *G06T 5/70* (2024.01); *G06T 7/90* (2017.01); *G06T 2207/10028* (2013.01); *G06T 2207/30164* (2013.01)

(58) Field of Classification Search
None
See application file for complete search history.

(56) References Cited

U.S. PATENT DOCUMENTS 8,471,895 B2 6/2013 Banks
10,909,755 B2 2/2021 Engholm et al.
(Continued)

FOREIGN PATENT DOCUMENTS

CN 103925889 7/2014
CN 104680496 1/2018
(Continued)

OTHER PUBLICATIONS

"Office Action of Taiwan Counterpart Application", issued on Nov. 8, 2024, p. 1-p. 3.
(Continued)

*Primary Examiner* — James A Thompson
(74) *Attorney, Agent, or Firm* — JCIPRNET

(57) ABSTRACT

A three-dimensional imaging method includes: projecting structured light pattern on a reference plane and capturing a reference plane image of the reference plane to obtain a reference phase; projecting structured light pattern on a workpiece surface and capturing a workpiece surface image set of the workpiece surface to obtain a workpiece phase; obtaining a workpiece phase difference based on the difference between the reference phase and the workpiece phase; performing temporal binarization encoding on the workpiece surface image set to generate a coded image; detecting noise areas in the coded image; integrating the noise areas to establish a noise phase mask; filtering noises in the coded image according to the noise phase mask to generate a noise-filtered phase; compensating for the noise-filtered phase to restore the workpiece phase difference; and performing three-dimensional reconstructing on the restored workpiece phase difference to form a 3D point cloud of the workpiece surface.

16 Claims, 6 Drawing Sheets

(56) References Cited

U.S. PATENT DOCUMENTS

| | | | | |
|---|---|---|---|---|
| 2007/0177160 | A1* | 8/2007 | Sasaki | G01B 11/2518 356/603 |
| 2015/0022638 | A1* | 1/2015 | Saeki | G06T 7/0004 348/46 |
| 2016/0284102 | A1* | 9/2016 | Yoshikawa | G01C 3/08 |
| 2018/0025475 | A1* | 1/2018 | Kato | H04N 25/44 348/241 |
| 2018/0253863 | A1* | 9/2018 | Wallack | G06T 7/521 |
| 2021/0191251 | A1* | 6/2021 | Eckhouse | H04N 13/204 |
| 2022/0207283 | A1 | 6/2022 | Kao et al. | |
| 2023/0316468 | A1* | 10/2023 | Srivastava | G06T 7/74 348/136 |

FOREIGN PATENT DOCUMENTS

| | | |
|---|---|---|
| CN | 114234851 | 3/2022 |
| CN | 113012277 | 6/2022 |
| CN | 114792305 | 7/2022 |
| CN | 116402945 | 7/2023 |
| CN | 116817794 | 9/2023 |
| TW | I680276 | 12/2019 |
| TW | 202143726 | 11/2021 |

OTHER PUBLICATIONS

Linyan Cui et al., "Hole Repairing Algorithm for 3D Point Cloud Model of Symmetrical Objects Grasped by the Manipulator", Sensors, Nov. 13, 2021, pp. 1-18.

Chi Zhang et al., "A Robust Surface Coding Method for Optically Challenging Objects Using Structured Light", IEEE Transactions on Automation Science and Engineering, Jul. 2014, pp. 1-15.

Guan Xu et al., "Accurate Measurement and Evaluation Methodology of Vehicle-Body Symmetry Plane Verified by Absolute Benchmark", IEEE Transactions on Instrumentation and Measurement, Aug. 11, 2022, pp. 1-12.

* cited by examiner

THREE-DIMENSIONAL IMAGING SYSTEM AND THREE-DIMENSIONAL IMAGING METHOD

CROSS-REFERENCE TO RELATED APPLICATION

This application claims the priority benefit of Taiwan application serial no. 112140867, filed on Oct. 25, 2023. The entirety of the above-mentioned patent application is hereby incorporated by reference herein and made a part of this specification.

TECHNICAL FIELD

The disclosure relates to an imaging system, and in particular relates to a three-dimensional imaging system and a three-dimensional imaging method.

BACKGROUND

The types of workpieces on the production line are diverse, and many of them possess reflective or light-absorbing properties. In order to ensure the quality of the three-dimensional point cloud of the workpiece, the 3D camera parameters are usually adjusted, or photography equipment with multiple viewing angles is used to image the workpiece. However, no matter which method is used, it is necessary to capture the workpiece multiple times and fuse the point clouds to obtain a complete point cloud, which also lengthens the capturing time. In addition, if imaging of the workpiece is conducted through only one parameter or from a single viewing angle, the point cloud is prone to damage, leading to system misjudgment. Consequently, the system cannot carry out subsequent inspection or positioning of the workpiece.

Therefore, how to shorten the time to image the workpiece and instantly predict the cause of point cloud damage is an urgent problem to be solved.

SUMMARY

A three-dimensional imaging system, which includes a projection device, an image capture device, and a processor, is provided in the disclosure. The projection device is configured to respectively project a structured light pattern on a reference plane and a workpiece surface. The image capture device is configured to capture a reference plane image of the reference plane and a workpiece surface image set of the workpiece surface. The processor is coupled to the image capture device and configured to perform the following operation. The reference plane image and the workpiece surface image set are received. A reference phase is obtained according to the reference plane image, and a workpiece phase is obtained according to the workpiece surface image set. A workpiece phase difference is obtained based on a difference between the reference phase and the workpiece phase. Temporal binarization encoding is performed on the workpiece surface image set to generate a coded image. At least one noise area is detected in the coded image. The at least one noise area is integrated to establish a noise phase mask. Noise is filtered in the coded image according to the noise phase mask to generate a noise-filtered phase. The noise-filtered phase is compensated for to restore the workpiece phase difference. Three-dimensional reconstructing is performed on the restored workpiece phase difference to form a three-dimensional point cloud of the workpiece surface.

An embodiment of the disclosure, the processor is further configured to perform the following operation. A maximum grayscale value and a minimum grayscale value of each pixel position in the workpiece surface image set are obtained. A difference between the maximum grayscale value and the minimum grayscale value is an image grayscale difference. A pixel grayscale value of each of the pixel positions in the workpiece surface image set is obtained. A difference between the pixel grayscale value and the minimum grayscale value is calculated based on the pixel grayscale value of each pixel to obtain a pixel grayscale difference corresponding to each of the pixel positions. A grayscale ratio value of each of the pixel positions is obtained based on a ratio of a pixel grayscale difference at each of the pixel positions to an image grayscale difference. The grayscale ratio value of each of the pixel positions is compared with a threshold value to set a binarization code of each of the pixel positions. In response to the pixel position where the grayscale ratio value is less than a threshold value, the binarization code of the pixel position is set to 0. In response to the pixel position where the grayscale ratio value is not less than the threshold value, the binarization code of the pixel position is set to 1. The coded image is generated based on the binarization code of each of the pixel positions in the workpiece surface image set.

In an embodiment of the disclosure, a color of the corresponding pixel position in the coded image is related to the binarization encoding of the pixel position. The binarization encoding corresponding to the pixel position is 0, and the processor sets the color corresponding to the pixel position in the coded image to black. The binarization encoding corresponding to the pixel position is 1, and the processor sets the color corresponding to the pixel position in the coded image to white.

In an embodiment of the disclosure, the coded image is a black and white striped image including multiple black stripes interlaced with multiple white stripes, each black stripe has a first width, and each white stripe has a second width.

In an embodiment of the disclosure, the processor is further configured to adjust a ratio of the first width to the second width by adjusting a threshold value. When the ratio of the first width to the second width is 1, the threshold is set as a comparison threshold value.

In an embodiment of the disclosure, the at least one noise area includes: an area with at least one white block in at least one black stripe; an area with at least one black block in at least one white stripe; an area where at least two black stripes or at least two white stripes are connected; or a blurred area with at least one black stripe or at least one white stripe.

In an embodiment of the disclosure, the processor is further configured to perform mirror compensation on the noise-filtered phase based on a center line of the noise-filtered phase as a reference line to restore the workpiece phase difference.

In an embodiment of the disclosure, the processor is further configured to compensate for the noise-filtered phase according to a fitting trend line of the noise-filtered phase to restore the workpiece phase difference.

A three-dimensional imaging method is provided in the disclosure, including the following operation. A structured light pattern is projected on a reference plane and a reference plane image of the reference plane is captured to obtain a reference phase. A structured light pattern is projected on a workpiece surface and a workpiece surface image set of the workpiece surface is captured to obtain a workpiece phase. A workpiece phase difference is obtained based on a difference between the reference phase and the workpiece phase. Temporal binarization encoding is performed on the workpiece surface image set to generate a coded image. At least one noise area is detected in the coded image. The at least one noise area is integrated to establish a noise phase mask. Noise is filtered in the coded image according to the noise phase mask to generate a noise-filtered phase. The noise-filtered phase is compensated for to restore the workpiece phase difference. Three-dimensional reconstructing is performed on the restored workpiece phase difference to form a three-dimensional point cloud of the workpiece surface.

Based on the above, the three-dimensional imaging system and three-dimensional imaging method provided by the disclosure only require a single capture to obtain a set of workpiece surface image set. By predicting image noise, establishing a noise phase mask, filtering the noise to generate a noise-filtered phase, and compensating the noise-filtered phase to restore the workpiece phase difference, the three-dimensional point cloud reconstruction of the workpiece is realized. Therefore, the three-dimensional imaging system and three-dimensional imaging method provided by the disclosure do not need to capture the workpiece multiple times or adjust parameters. The workpiece is captured only through one viewing angle or a set of parameters, thereby saving capturing time.

DETAILED DESCRIPTION OF DISCLOSED EMBODIMENTS

Some exemplary embodiments of the disclosure will be described in detail with reference to the accompanying drawings. Element symbol referenced in the following description will be regarded as the same or similar element when the same element symbol appears in different drawings. The exemplary embodiments are only a portion of the disclosure and do not disclose all possible embodiments of the disclosure. More precisely, these exemplary embodiments are only examples of the method, device, and system within the scope of the patent application of the disclosure.

Figure 1:
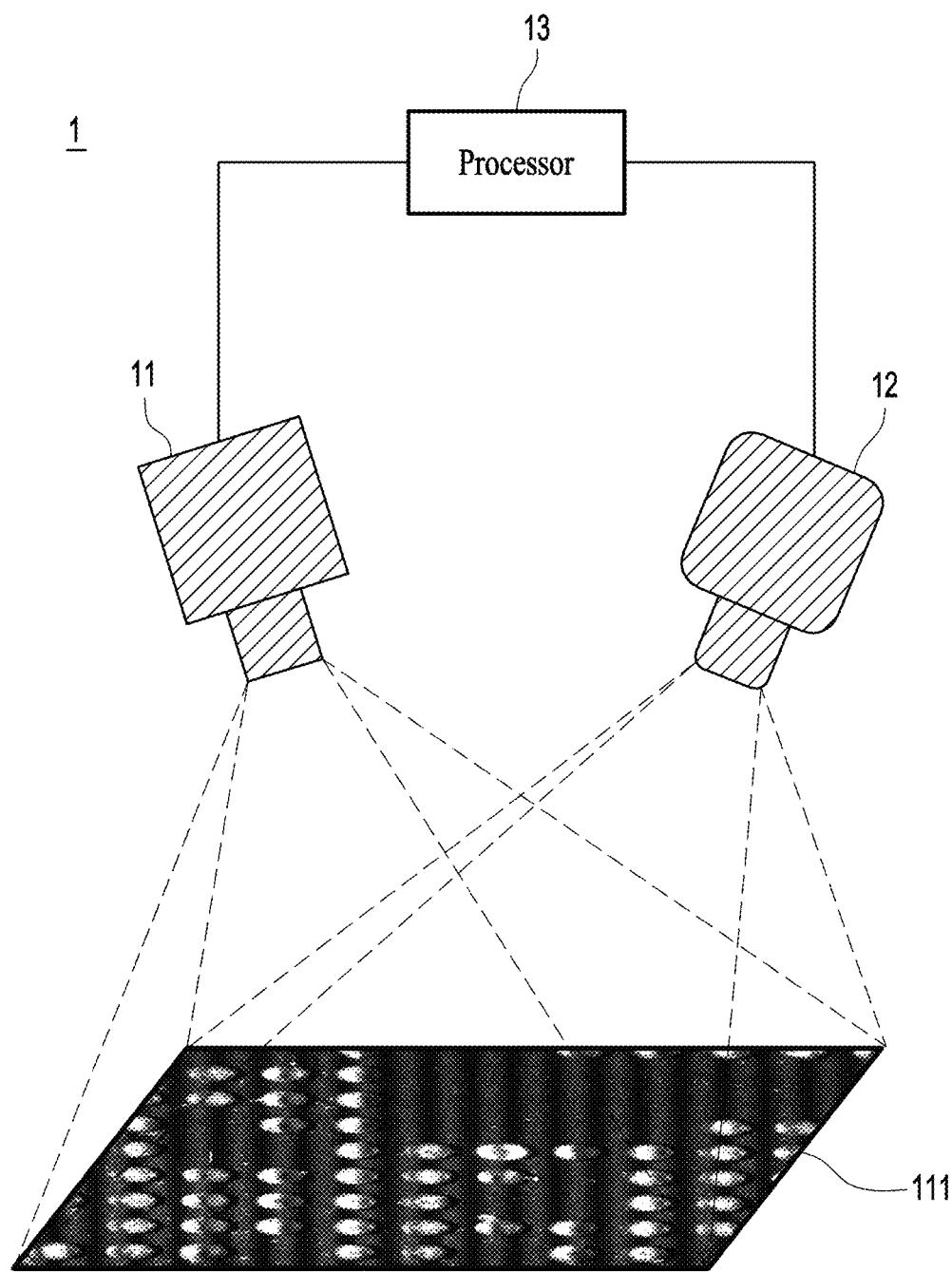
FIG. 1 is a schematic diagram of a three-dimensional imaging system according to an embodiment of the disclosure.

FIG. 1 is a schematic diagram of a three-dimensional imaging system 1 according to an embodiment of the disclosure. The three-dimensional imaging system 1 of the disclosure includes a projection device 11, an image capture device 12, and a processor 13. First, the various components and configuration relationships in the three-dimensional imaging system 1 are introduced through FIG. 1. The detailed functions are disclosed in conjunction with subsequent embodiments.

The projection device 11 is electrically or wirelessly connected to the processor 13. After receiving the control signal from the processor 13, the projection device 11 projects a structured light pattern 111 to the reference plane and the workpiece surface to be projected. In practice, the projection device 11 may be, for example, a general projector, a wireless projector, or other projection device with a projection function.

The type of the structured light pattern 111 may be roughly divided into light points, stripes, and spatial patterns. Both the light point structured light and spatial pattern structured light involve geometric calculations conducted point by point, while the stripe structured light pattern is a coded striped light image. The structured light pattern 111 may be generated by a structured light generator (not shown) and projected onto the reference plane and the workpiece surface through the projection device 11. In the disclosure, a stripe structured light pattern is projected through the projection device 11. The projection device 11 may project multiple structured light patterns 111 to the reference plane and the workpiece surface using, for example, a five-step phase shift method.

When the projection device 11 projects multiple structured light patterns 111 to the reference plane, the image capture device 12 captures the reference plane image of the reference plane. Furthermore, when the projection device 11 projects multiple structured light patterns 111 to the workpiece surface, the image capture device 12 captures a workpiece surface image set of the workpiece surface, in which the workpiece surface image set includes multiple workpiece surface images. In practice, the image capture device 12 is, for example, a camera or other image capture devices with photographic and image capture capabilities.

The processor 13 is coupled to the image capture device 12 for receiving images captured by the image capture device 12 and performing subsequent processing on the images. In practice, the processor 13 may be, for example, a central processing unit (CPU) with image data processing and computing functions, or other programmable general-purpose or special-purpose microprocessor, a digital signal processor (DSP), an image processing unit (IPU), a graphics processing unit (GPU), a programmable controller, an application specific integrated circuit (ASIC), a programmable logic device (PLD), and other similar control devices, or a combination of these devices.

Figure 2:
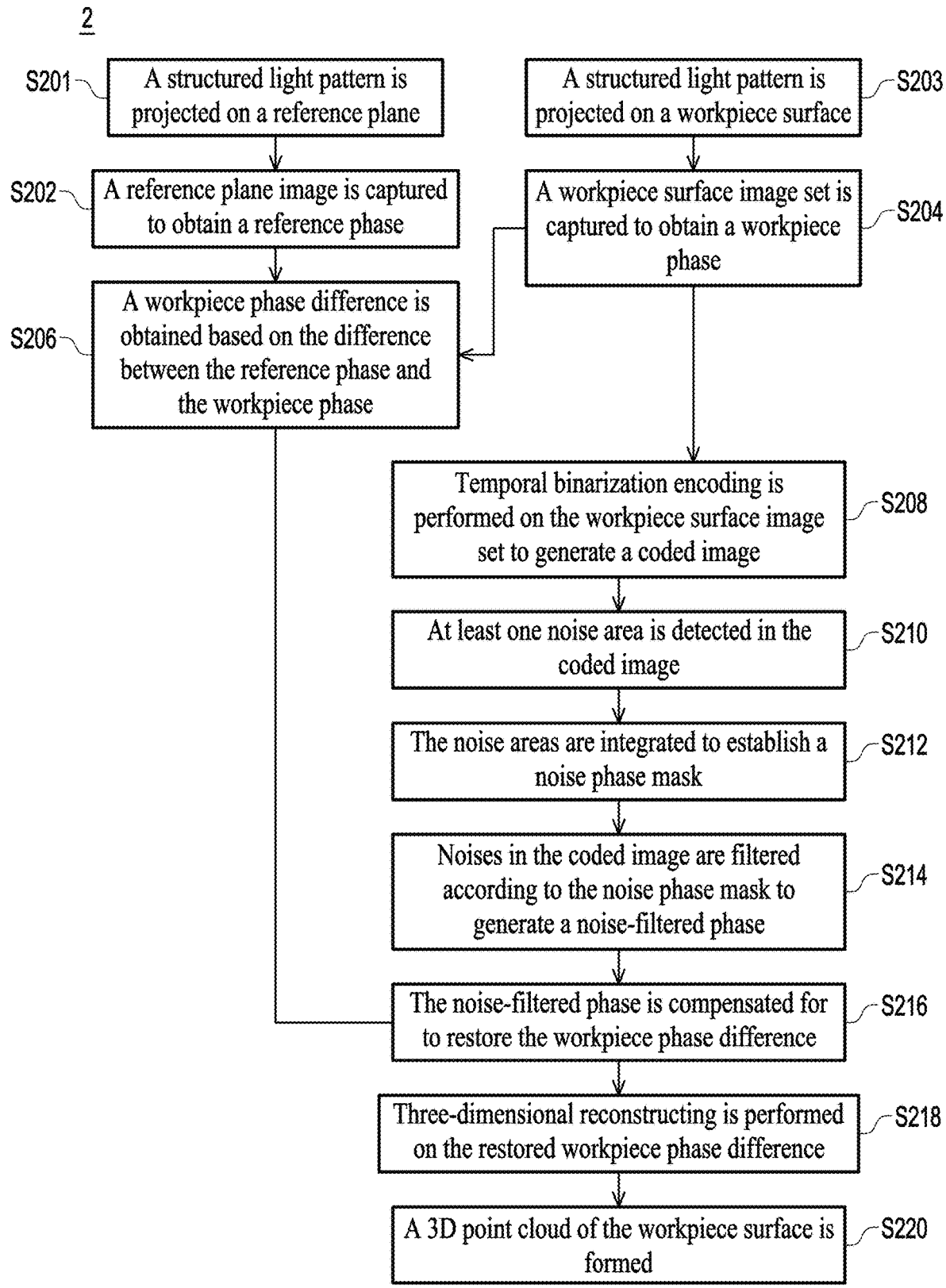
FIG. 2 is a flowchart of a three-dimensional imaging method according to an embodiment of the disclosure.

FIG. 2 is a flowchart of a three-dimensional imaging method 2 according to an embodiment of the disclosure. The three-dimensional imaging method 2 in FIG. 2 may be executed by the three-dimensional imaging system 1 in FIG. 1. Next, please refer to FIG. 1 and FIG. 2 at the same time. The three-dimensional imaging method 2 includes steps S201 to S204, S206, S208, S210, S212, S214, S216, S218, and S220.

In step S201, the structured light pattern 111 is projected on a reference plane through the projection device 11, in which the reference plane may be a plane on which the workpiece is to be placed. Next, while the projection device 11 continues to project the structured light pattern 111 on the reference plane, in step S202, the reference plane image of the reference plane is captured through the image capture device 12. The processor 13 receives the reference plane image, and obtains the reference phase according to the reference plane image.

In step S203, the structured light pattern 111 is projected on a workpiece surface through the projection device 11, in which the workpiece is placed on the above-mentioned reference plane. Next, while the projection device 11 continues to project the structured light pattern 111 on the workpiece surface, in step S204, the workpiece surface image set of the workpiece surface is captured through the image capture device 12. The processor 13 receives the workpiece surface image set, and obtains the workpiece phase according to the workpiece surface image set. The workpiece surface image set includes multiple workpiece surface images.

Figure 3:
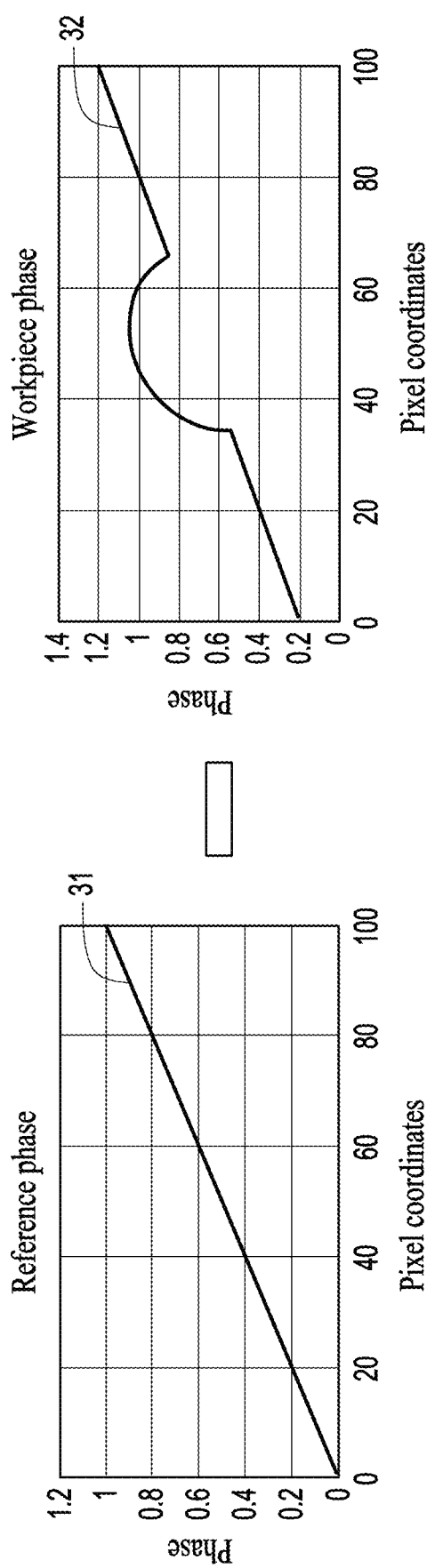
FIG. 3 is a schematic diagram of obtaining a workpiece phase difference in a three-dimensional imaging system and a three-dimensional imaging method according to an embodiment of the disclosure.
Figure 3:
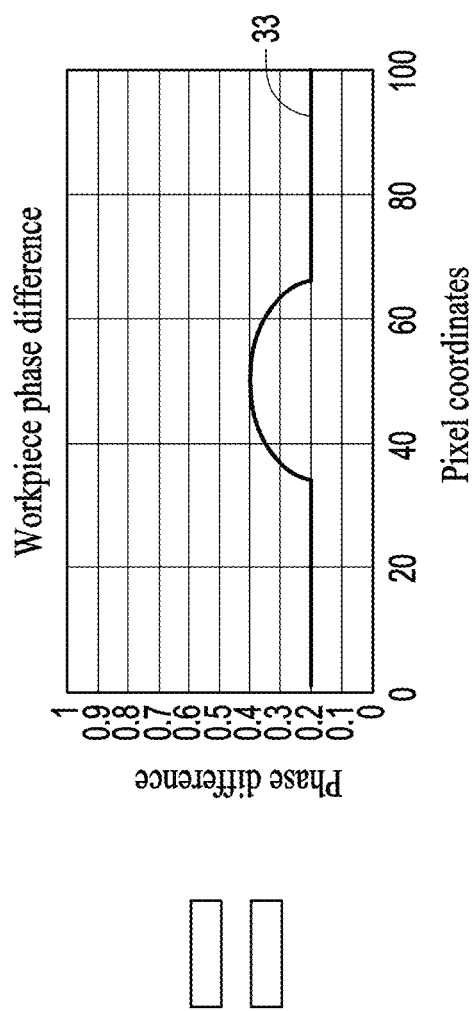

In step S206, after obtaining the reference phase and the workpiece phase, the processor 13 obtains the workpiece phase difference based on the difference between the reference phase and the workpiece phase. FIG. 3 is a schematic diagram of obtaining a workpiece phase difference 33 based on the difference between reference phase 31 and the workpiece phase 32 in a three-dimensional imaging system 1 and a three-dimensional imaging method 2 according to an embodiment of the disclosure.

Since the reference plane is a plane, the reference phase 31 shown in FIG. 3 is a straight line. The workpiece is placed on the reference plane. Each workpiece surface image in the workpiece surface image set includes the workpiece surface and the reference plane that is not covered by the workpiece. Therefore, the position corresponding to the workpiece placement on the reference plane in the workpiece phase 32 shown in FIG. 3 is a non-linear pattern. After obtaining the reference phase 31 and the workpiece phase 32, the processor 13 obtains the workpiece phase difference 33 based on the difference between the reference phase 31 and the workpiece phase 32.

In step S208, the processor 13 performs temporal binarization encoding on the workpiece surface image set to generate a coded image. In step S210, at least one noise area in the coded image is detected through the processor 13. In step S212, at least one noise area is integrated through the processor 13 to establish a noise phase mask. Next, steps S208 to S212 are further described with reference to FIG. 4.

Figure 4:
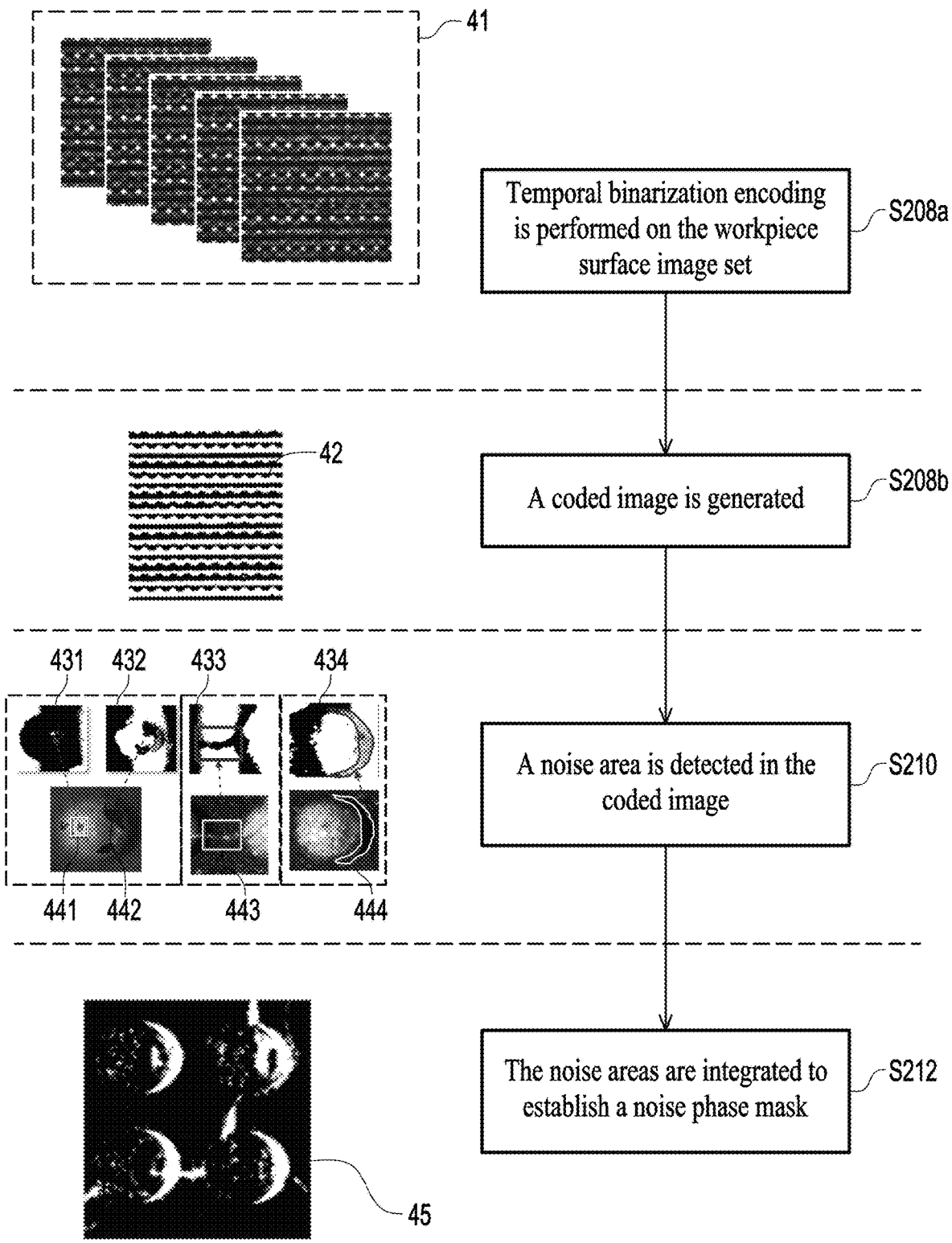
FIG. 4 is a schematic diagram according to steps S208 to S212 of FIG. 2.

FIG. 4 is a schematic diagram according to steps S208 to S212 of FIG. 2. For ease of explanation, step S208 shown in FIG. 2 is split into steps S208a and S208b in FIG. 4. In step S208a, the processor 13 performs temporal binarization encoding on the workpiece surface image set 41. As mentioned above, the projection device 11 projects i structured light patterns 111 to the workpiece surface using, for example, a five-step phase shift method. The image capture device 12 captures a workpiece surface image set 41 of the workpiece surface. The workpiece surface image set 41 includes i workpiece surface images (phase-shifted images), and the size of each workpiece surface image is the same. The processor 13 obtains the grayscale ratio value of each pixel position in each workpiece surface image of the workpiece surface image set 41.

Specifically, the processor 13 obtains the pixel grayscale value J for each pixel position in each workpiece surface image of the workpiece surface image set 41. If the workpiece surface image set 41 includes i workpiece surface images, then there are i pixel grayscale values J obtained by the processor 13 at each pixel position. However, the pixel grayscale value J of each pixel position in each workpiece surface image is different. For each pixel position, the processor 13 extracts the maximum grayscale value $$\max_i J_i$$

and the minimum grayscale value $$\min_i J_i$$

of each pixel position in each workpiece surface image. The difference between the maximum grayscale value $$\max_i J_i$$

and the minimum grayscale value $$\min_i J_i$$

is the image grayscale difference $$\max_i J_i - \min_i J_i.$$

In addition, the processor 13 obtains the pixel grayscale value J of each pixel position in each workpiece surface image set 41, and calculates the difference between the pixel grayscale value J and the minimum grayscale value $$\min_i J_i$$

based on the pixel grayscale value J of each pixel to obtain the pixel grayscale difference $$J - \min_i J_i$$

corresponding to each pixel position.

After the processor 13 obtains the image grayscale difference $$\max_i J_i - \min_i J_i$$

and the pixel grayscale difference $$J - \min_i J_i$$

corresponding to each pixel position, the processor 13 obtains the grayscale ratio value G of each pixel position based on the ratio of the pixel grayscale difference $$J - \min_i J_i$$

and the image grayscale difference $$\max_i J_i - \min_i J_i$$

at each pixel position, where $$G = \frac{J - \min_i J_i}{\max_i J_i - \min_i J_i}.$$

Next, the processor 13 compares the grayscale ratio value G of each pixel position with the threshold value $G_{th}$ to set the binarization code b of each pixel position, where $$b = \begin{cases} 0, & G < G_{th} \\ 1, & G \geq G_{th} \end{cases}.$$

That is, in response to the pixel position where the grayscale ratio value G is smaller than the threshold value $G_{th}$, the processor 13 sets the binarization code b of the pixel position to 0; in response to the pixel position where the grayscale ratio value G is not less than the threshold value $G_{th}$, the processor 13 sets the binarization code b of the pixel position to 1.

Once the processor 13 completes setting the binarization code b of each pixel position, in step S208b, the coded image 42 is generated based on the binarization code b of each pixel position in the workpiece surface image set 41.

The coded image 42 is a black and white striped image including multiple black stripes interlaced with multiple white stripes, and the color of the corresponding pixel position in the coded image 42 is related to the binarizaiton code b of the pixel position. Specifically, in response to the binarization code b of the pixel position being 0, the processor 13 sets the color corresponding to the pixel position in the coded image 42 to black; in response to the binarization code b of the pixel position being 1, the processor 13 sets the color corresponding to the pixel position in the coded image 42 to white.

Each of the black stripes in the coded image 42 has a first width, and each of the white stripes in the coded image 42 has a second width. Since the first width and the second width are related to the binarization code b of the pixel position, and the binarization code b is determined by comparing the grayscale ratio value G and the threshold value $G_{th}$, the threshold value $G_{th}$ used by the processor 13 to compare the grayscale ratio value G with the threshold value $G_{th}$ of each pixel position is related to the first width and the second width. The processor 13 may adjust the threshold value $G_{th}$ to adjust the ratio of the first width to the second width. When the ratio of the first width to the second width is 1 (i.e., the first width and the second width are equal), the processor 13 sets the threshold value $G_{th}$ corresponding to when the ratio of the first width to the second width is 1 as the final comparison threshold value.

In step S210, at least one noise area in the coded image 42 is detected through the processor 13, such as the noise areas 431 to 434 in FIG. 4. The noise area 431 is an area with white blocks in the black stripes, which is caused by the error condition 441 of point cloud elimination caused by secondary reflection in this area. The noise area 432 is an area with black blocks in the white stripes, which is caused by an error condition 442 of point cloud elimination caused by insufficient light source reception in this area. The noise area 433 is an area where at least two black stripes or at least two white stripes are connected, which is caused by an error condition 443 of point cloud elimination due to the influence of plane contamination. The noise area 434 is an area with blurred black stripes or blurred white stripes, which is caused by an error condition 444 of point cloud elimination due to plane encoding blur.

In step S212, the noise areas 431 to 434 are integrated through the processor 13 to establish the noise phase mask 45.

Figure 5:
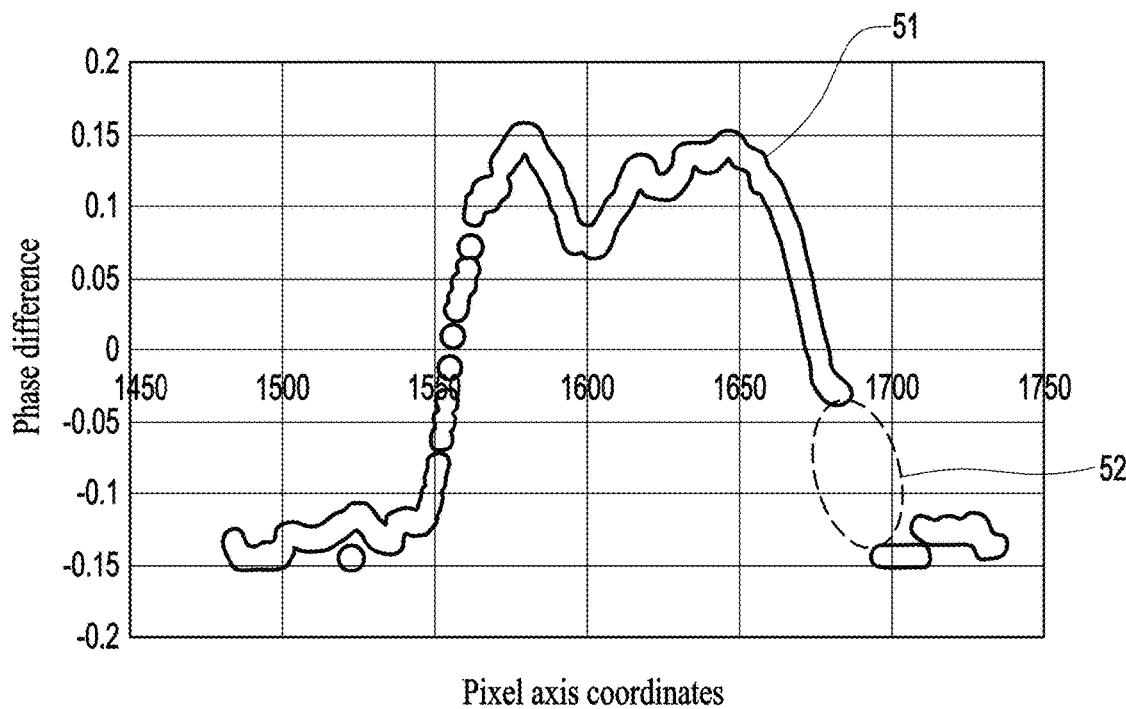
FIG. 5 is a schematic diagram of a noise-filtered phase in a three-dimensional imaging system and a three-dimensional imaging method according to an embodiment of the disclosure.

Continue referring to FIG. 1 to FIG. 2, in step S214, the noise in the coded image 42 is filtered through the processor 13 according to the noise phase mask 45 to generate a noise-filtered phase. FIG. 5 is a schematic diagram of a noise-filtered phase 51 in a three-dimensional imaging system 1 and a three-dimensional imaging method 2 according to an embodiment of the disclosure. It may be seen from FIG. 5 that the noise-filtered phase 51 is similar to the workpiece phase difference 33 shown in FIG. 3, but there is an obvious line segment gap 52 on the line segment of the noise-filtered phase 51. The workpiece phase difference 33 may be restored by compensating the line segment gap 52 of the noise-filtered phase 51.

In step S216, the noise-filtered phase 51 is compensated for through the processor 13 according to the workpiece characteristics to restore the workpiece phase difference 33. Specifically, the processor 13 compensates the line segment gap 52 of the noise-filtered phase 51 according to the workpiece characteristics to restore the workpiece phase difference 33. The following describes an embodiment in which the processor 13 compensates for the noise-filtered phase 51 to restore the workpiece phase difference 33.

Figure 6:
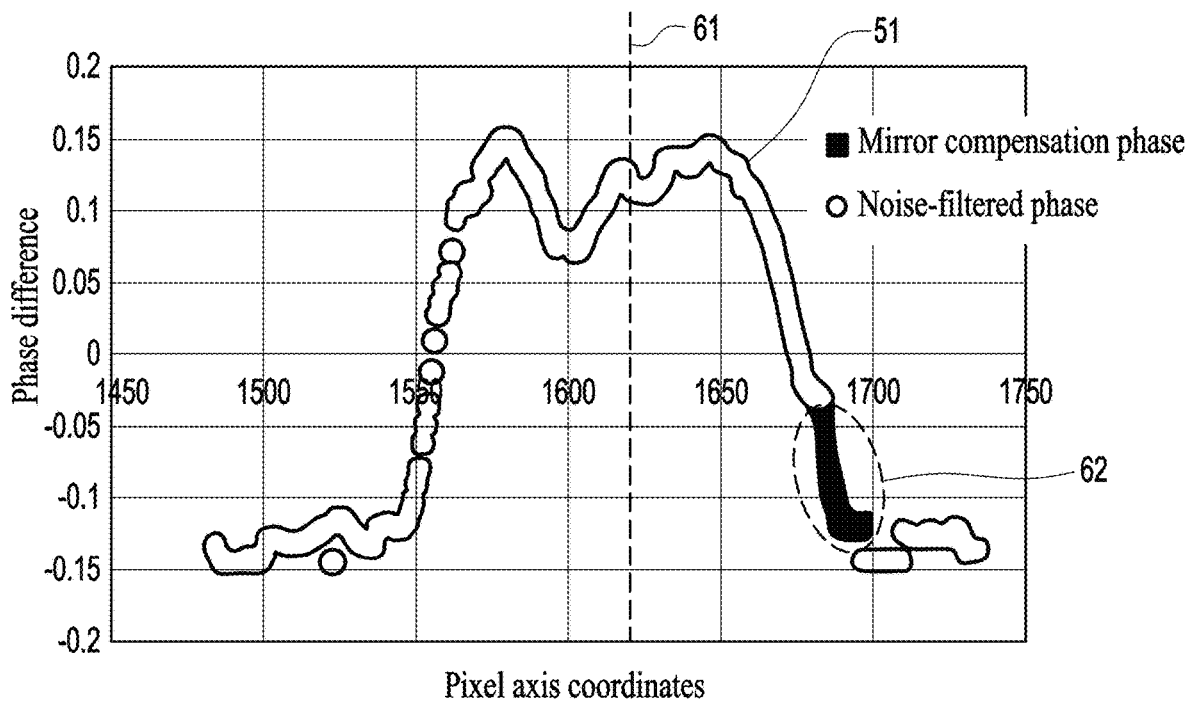
FIG. 6 is a schematic diagram of a compensated noise-filtered phase in a three-dimensional imaging system and a three-dimensional imaging method according to an embodiment of the disclosure.

FIG. 6 is a schematic diagram of a compensated noise-filtered phase 51 in a three-dimensional imaging system 1 and a three-dimensional imaging method 2 according to an embodiment of the disclosure. Taking solder ball work as an example, since the shape of the surface of the solder ball is symmetrical, based on the center line 61 of the noise-filtered phase 51 as the reference line, the processor 13 performs mirror compensation on the noise-filtered phase 51 to restore the workpiece phase difference 33. That is, after the processor compensates the line segment gap 52 of the noise-filtered phase 51 shown in FIG. 5 with the compensation line segment 62, the workpiece phase difference 33 is restored.

Figure 7:
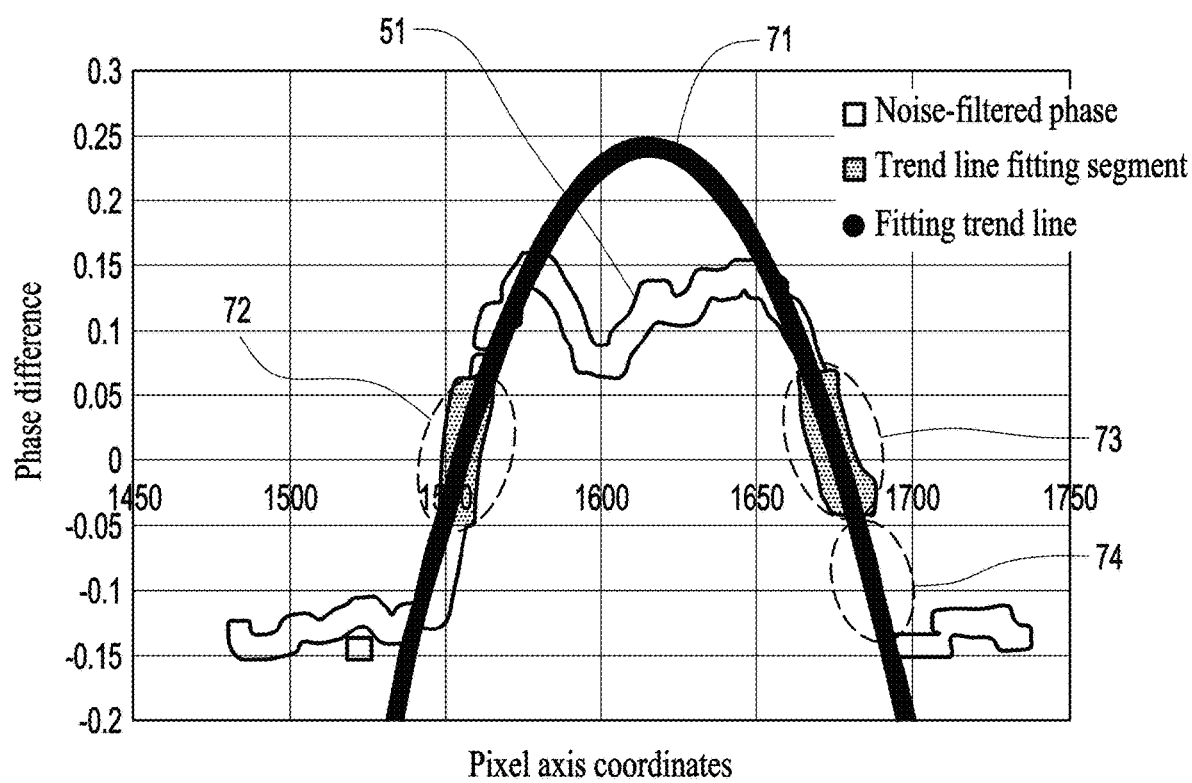
FIG. 7 is a schematic diagram of a compensated noise-filtered phase in a three-dimensional imaging system and a three-dimensional imaging method according to another embodiment of the disclosure.

FIG. 7 is a schematic diagram of a compensated noise-filtered phase 51 in a three-dimensional imaging system 1 and a three-dimensional imaging method 2 according to another embodiment of the disclosure. Taking the solder ball work as an example, since the shape of the solder ball surface is a symmetrical arc, the processor 13 may generate the fitting trend line 71 of the noise-filtered phase 51 through the ideal arc shape of the solder ball surface. Especially when the trend line fitting segments 72 and 73 of the fitting trend line 71 approximately overlap with the noise-filtered phase 51, the processor 13 may determine the shape and position of the fitting trend line 71. Once the shape and position of the fitting trend line 71 are determined, the processor 13 compensates for the noise-filtered phase 51 according to the fitting trend line 71 of the noise-filtered phase 51 to restore the workpiece phase difference 33. That is, after the processor compensates the line segment gap 52 of the noise-filtered phase 51 shown in FIG. 5 with the compensation line segment 74, the workpiece phase difference 33 is restored.

Continue referring to FIG. 1 to FIG. 2, in step S218, three-dimensional reconstructing is performed on the restored workpiece phase difference through the processor 13, and then, in step S220, a three-dimensional point cloud of the workpiece surface is formed through the processor 13. Once the three-dimensional point cloud of the workpiece surface is formed, the processor 13 may perform three-dimensional imaging of the workpiece surface.

To sum up, the three-dimensional imaging system and three-dimensional imaging method provided by the disclosure only require a single capture to obtain a set of workpiece surface image set. By predicting image noise, establishing a noise phase mask, filtering the noise to generate a noise-filtered phase, and compensating the noise-filtered phase to restore the workpiece phase difference, the three-dimensional point cloud reconstruction of the workpiece is realized. Therefore, the three-dimensional imaging system and three-dimensional imaging method provided by the disclosure do not need to capture the workpiece multiple times or adjust parameters. The workpiece is captured only through one viewing angle or a set of parameters, thereby saving capturing time.

What is claimed is:

1. A three-dimensional imaging system, comprising:
a projection device, configured to respectively project a structured light pattern on a reference plane and a workpiece surface
an image capture device, configured to capture a reference plane image of the reference plane and a workpiece surface image set of the workpiece surface, wherein the workpiece surface image set comprises a plurality of workpiece surface images;
a processor, coupled to the image capture device and configured to:
receive the reference plane image and the workpiece surface image set;
obtain a reference phase according to the reference plane image, and obtain a workpiece phase according to the workpiece surface image set;
obtain a workpiece phase difference based on a difference between the reference phase and the workpiece phase;
perform temporal binarization encoding on the workpiece surface image set to generate a coded image;
detect at least one noise area in the coded image;
integrate the at least one noise area to establish a noise phase mask;
filter noise in the coded image according to the noise phase mask to generate a noise-filtered phase;
compensate for the noise-filtered phase to restore the workpiece phase difference; and
perform three-dimensional reconstructing on the workpiece phase difference that is restored to form a three-dimensional point cloud of the workpiece surface.

2. The three-dimensional imaging system according to claim 1, wherein the processor is further configured to:
obtain a maximum grayscale value and a minimum grayscale value of each pixel position in the workpiece surface image set, wherein a difference between the maximum grayscale value and the minimum grayscale value is an image grayscale difference;
obtain a pixel grayscale value of each of the pixel positions in the workpiece surface image set;
calculate a difference between the pixel grayscale value and the minimum grayscale value based on the pixel grayscale value of each pixel to obtain a pixel grayscale difference corresponding to each of the pixel positions;
obtain a grayscale ratio value of each of the pixel positions based on a ratio of the pixel grayscale difference to the image grayscale difference at each of the pixel positions;
compare the grayscale ratio value of each of the pixel positions with a threshold value to set a binarization code of each of the pixel position, wherein in response to the pixel position where the grayscale ratio value is less than a threshold value, the binarization code of the pixel position is set to 0, in response to the pixel position where the grayscale ratio value is not less than the threshold value, the binarization code of the pixel position is set to 1; and
generate the coded image based on the binarization code of each of the pixel positions in the workpiece surface image set.

3. The three-dimensional imaging system according to claim 2, wherein a color of the corresponding pixel position in the coded image is related to the binarization code of the pixel position;
wherein in response to the binarization code of the pixel position being 0, the processor sets the color corresponding to the pixel position in the coded image to black;
wherein in response to the binarization code of the pixel position being 1, the processor sets the color corresponding to the pixel position in the coded image to white.

4. The three-dimensional imaging system according to claim 3, wherein the coded image is a black and white striped image comprising a plurality of black stripes interlaced with a plurality of white stripes, each of the black stripes has a first width, and each of the white stripes has a second width.

5. The three-dimensional imaging system according to claim 4, wherein the processor is further configured to:
adjust a ratio of the first width to the second width by adjusting the threshold value; and
set the threshold value as a comparison threshold value when the ratio of the first width to the second width is 1.

6. The three-dimensional imaging system according to claim 4, wherein the at least one noise area comprises:
an area with at least one white block in at least one of the black stripes;
an area with at least one black block in at least one of the white stripes;
an area where at least two of the black stripes or at least two of the white stripes are connected; or
a blurred area with at least one of the black stripes or at least one of the white stripes.

7. The three-dimensional imaging system according to claim 1, wherein the processor is further configured to:
perform mirror compensation on the noise-filtered phase based on a center line of the noise-filtered phase as a reference line to restore the workpiece phase difference.

8. The three-dimensional imaging system according to claim 1, wherein the processor is further configured to:
compensate for the noise-filtered phase according to a fitting trend line of the noise-filtered phase to restore the workpiece phase difference.

9. A three-dimensional imaging method, comprising:
projecting a structured light pattern on a reference plane and capturing a reference plane image of the reference plane to obtain a reference phase;
projecting a structured light pattern on a workpiece surface and capturing a workpiece surface image set of the workpiece surface to obtain a workpiece phase, wherein the workpiece surface image set comprises a plurality of workpiece surface images;
obtaining a workpiece phase difference based on a difference between the reference phase and the workpiece phase;
performing temporal binarization encoding on the workpiece surface image set to generate a coded image;
detecting at least one noise area in the coded image;
integrating the at least one noise area to establish a noise phase mask;
filtering noise in the coded image according to the noise phase mask to generate a noise-filtered phase;
compensating for the noise-filtered phase to restore the workpiece phase difference; and
performing three-dimensional reconstructing on the workpiece phase difference that is restored to form a three-dimensional point cloud of the workpiece surface.

10. The three-dimensional imaging method according to claim 9, wherein performing the temporal binarization encoding on the workpiece surface image set to generate the coded image comprises:
obtaining a maximum grayscale value and a minimum grayscale value of each pixel position in the workpiece surface image set, wherein a difference between the maximum grayscale value and the minimum grayscale value is an image grayscale difference;
obtaining a pixel grayscale value of each of the pixel positions in the workpiece surface image set;
calculating a difference between the pixel grayscale value and the minimum grayscale value based on the pixel grayscale value of each pixel to obtain a pixel grayscale difference corresponding to each of the pixel positions;
obtaining a grayscale ratio value of each of the pixel positions based on a ratio of the pixel grayscale difference to the image grayscale difference at each of the pixel positions;
comparing the grayscale ratio value of each of the pixel positions with a threshold value to set a binarization code of each of the pixel position, wherein in response to the pixel position where the grayscale ratio value is less than a threshold value, the binarization code of the pixel position is set to 0, in response to the pixel position where the grayscale ratio value is not less than the threshold value, the binarization code of the pixel position is set to 1; and
generating the coded image based on the binarization code of each of the pixel positions in the workpiece surface image set.

11. The three-dimensional imaging method according to claim 10, wherein a color of the corresponding pixel position in the coded image is related to the binarization code of the pixel position;
wherein in response to the binarization code of the pixel position being 0, setting the color corresponding to the pixel position in the coded image to black;
wherein in response to the binarization code of the pixel position being 1, setting the color corresponding to the pixel position in the coded image to white.

12. The three-dimensional imaging method according to claim 11, wherein the coded image is a black and white striped image comprising a plurality of black stripes interlaced with a plurality of white stripes, each of the black stripes has a first width, and each of the white stripes has a second width.

13. The three-dimensional imaging method according to claim 12, further comprising:
adjusting a ratio of the first width to the second width by adjusting the threshold value; and
setting the threshold value as a comparison threshold value when the ratio of the first width to the second width is 1.

14. The three-dimensional imaging method according to claim 12, wherein the at least one noise area comprises:
an area with at least one white block in at least one of the black stripes;
an area with at least one black block in at least one of the white stripes;
an area where at least two of the black stripes or at least two of the white stripes are connected; or
a blurred area with at least one of the black stripes or at least one of the white stripes.

15. The three-dimensional imaging method according to claim 9, wherein compensating for the noise-filtered phase to restore the workpiece phase difference comprises:
performing mirror compensation on the noise-filtered phase based on a center line of the noise-filtered phase as a reference line to restore the workpiece phase difference.

16. The three-dimensional imaging method according to claim 9, wherein compensating for the noise-filtered phase to restore the workpiece phase difference comprises:
compensating for the noise-filtered phase according to a fitting trend line of the noise-filtered phase to restore the workpiece phase difference.

* * * * *